(12) United States Patent
Soryal et al.

(10) Patent No.: US 11,489,733 B2
(45) Date of Patent: Nov. 1, 2022

(54) SYSTEM AND METHOD FOR MOVEABLE CLOUD CLUSTER FUNCTIONALITY USAGE AND LOCATION FORECASTING

(71) Applicant: AT&T Intellectual Property I, L.P., Atlanta, GA (US)

(72) Inventors: Joseph Soryal, Ridgewood, NY (US); Naila Jaoude, Eatontown, NJ (US); James Ibezim, Ocean Township, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 165 days.

(21) Appl. No.: 16/901,901

(22) Filed: Jun. 15, 2020

(65) Prior Publication Data

US 2021/0392052 A1 Dec. 16, 2021

(51) Int. Cl.
*H04L 41/147* (2022.01)
*H04W 72/04* (2009.01)
*G06N 20/00* (2019.01)
*H04L 43/0876* (2022.01)
*G06Q 10/02* (2012.01)
*H04W 4/021* (2018.01)

(52) U.S. Cl.
CPC .......... *H04L 41/147* (2013.01); *G06N 20/00* (2019.01); *G06Q 10/02* (2013.01); *H04L 43/0876* (2013.01); *H04W 4/021* (2013.01); *H04W 72/0493* (2013.01)

(58) Field of Classification Search
CPC ... H04L 41/147; H04L 43/0876; G06N 20/00; G06Q 10/02; H04W 4/021; H04W 72/0493
See application file for complete search history.

(56) References Cited

U.S. PATENT DOCUMENTS

| | | | |
|---|---|---|---|
| 2006/0106530 A1* | 5/2006 | Horvitz | G08G 1/0104 701/117 |
| 2014/0143187 A1* | 5/2014 | Song | G06N 3/084 706/12 |
| 2014/0222321 A1* | 8/2014 | Petty | G01C 21/3492 701/117 |
| 2015/0253144 A1* | 9/2015 | Rau | G01C 21/3484 705/348 |
| 2015/0287057 A1* | 10/2015 | Baughman | H04L 41/145 705/7.31 |

(Continued)

OTHER PUBLICATIONS

"Crowdsensing in Urban Areas for City-Scale Mass Gathering Management: Geofencing and Activity Recognition"; Cardone et al., IEEE Sensors Journal, vol. 14, No. 12, Dec. 2014 (Year: 2014).*

*Primary Examiner* — Benjamin H Elliott, IV
(74) *Attorney, Agent, or Firm* — Guntin & Gust, PLC; Andrew Gust

(57) ABSTRACT

A method includes collecting data relating to an event, the data including a timing of the event and a location of the event, predicting attendance at the event based on the collected data, predicting network usage based on the predicted attendance of the event, instantiating virtual network resources based on the predicted network usage, collecting post event data relating to actual attendance and network metrics, comparing the post event data with the predicted attendance and predicted network usage and updating a prediction algorithm based on the comparing step.

20 Claims, 13 Drawing Sheets

(56) References Cited

U.S. PATENT DOCUMENTS

| | | | |
|---|---|---|---|
| 2015/0288571 A1* | 10/2015 | Baughman | H04L 41/16 |
| | | | 703/21 |
| 2015/0294216 A1* | 10/2015 | Baughman | G06F 40/279 |
| | | | 706/11 |
| 2016/0127943 A1* | 5/2016 | Shaw | H04L 41/0896 |
| | | | 370/230 |
| 2018/0158322 A1* | 6/2018 | McDonnell | H04W 4/025 |
| 2018/0199156 A1* | 7/2018 | Gandhi | H04W 4/023 |
| 2020/0210918 A1* | 7/2020 | Brand | G06Q 10/063112 |
| 2020/0228431 A1* | 7/2020 | Samadi | H04L 41/147 |
| 2021/0194907 A1* | 6/2021 | Bertiger | H04L 41/147 |
| 2021/0392052 A1* | 12/2021 | Soryal | G06Q 10/02 |

* cited by examiner

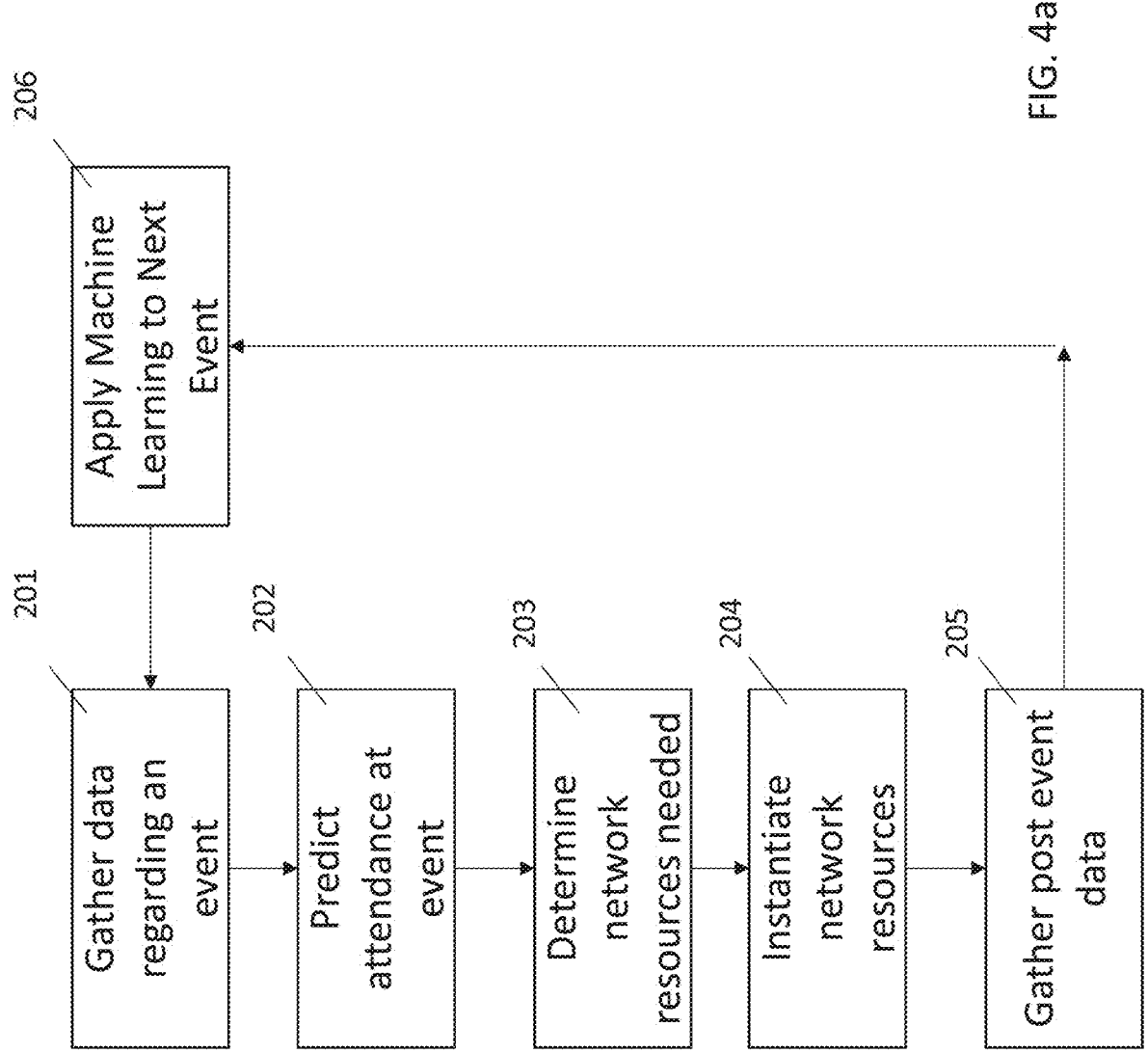

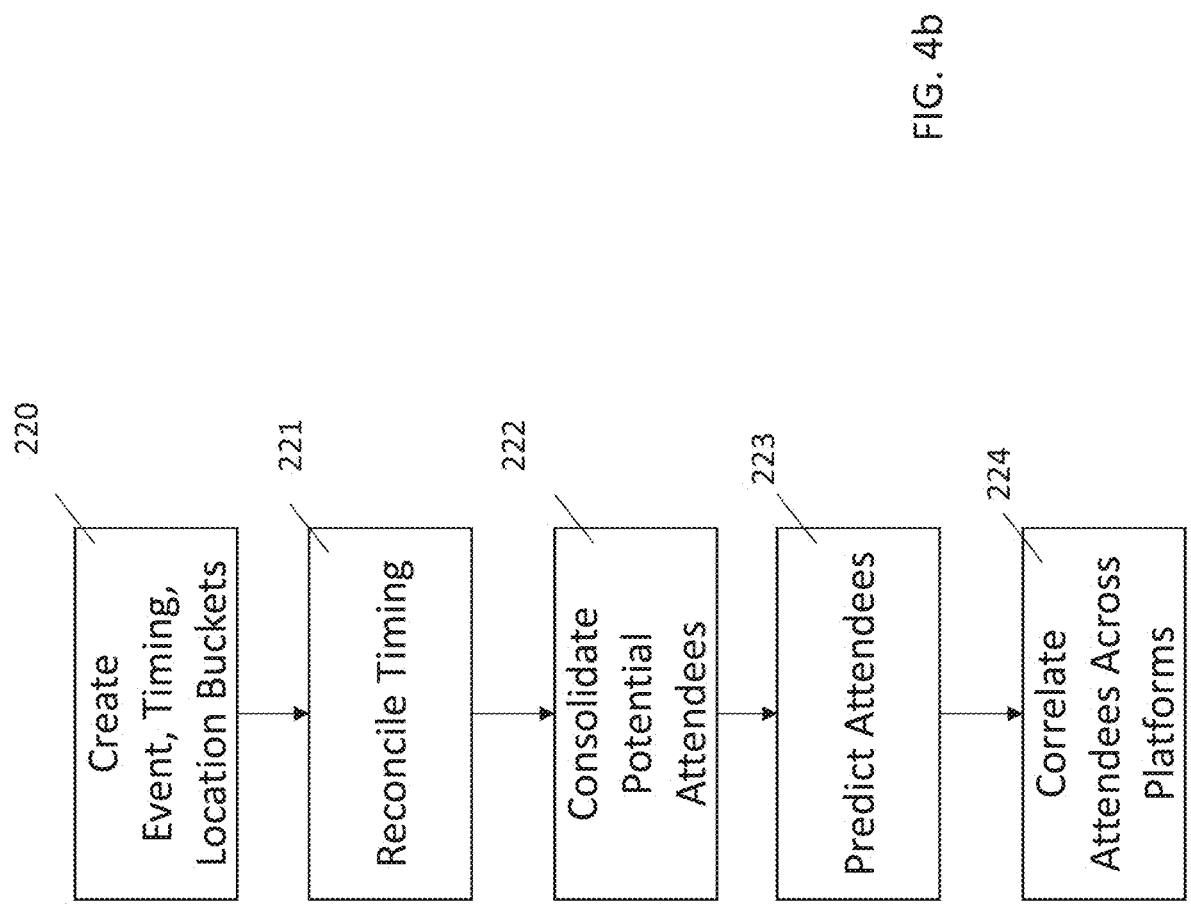

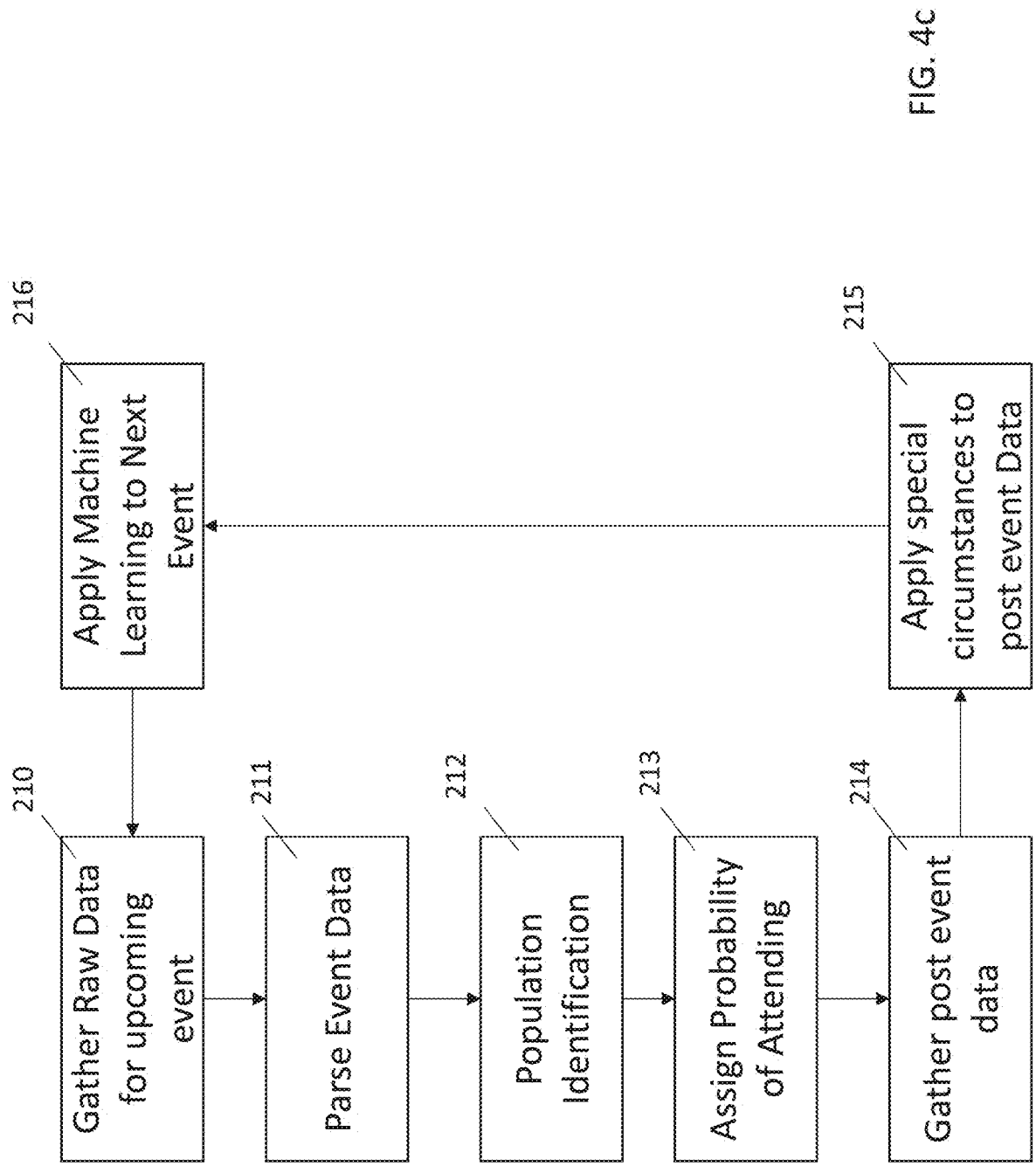

SYSTEM AND METHOD FOR MOVEABLE CLOUD CLUSTER FUNCTIONALITY USAGE AND LOCATION FORECASTING

TECHNICAL FIELD

This disclosure is directed to systems and methods for moving cloud functionality based on location forecasting.

BACKGROUND

Sporting events, concerts, conventions, parades, and other large gatherings may put a strain on the resources of the local infrastructure. This is true for telecommunications services as well. As more and more mobile telecommunication service providers transition to software defined networks and cloud-based infrastructure, quality of service issues become more and more important. For large gatherings, services issues such as network access, capacity, latency, and other performance criteria need to be addressed.

One of the challenges facing service providers is how to predict the demand such that sufficient telecommunications services are in place to service individuals participating in such large gatherings and still offer superior quality of service. There is a need to for systems and methods to model and predict usage in and around such large events and to automatically provide those resources.

SUMMARY

The present disclosure is directed to a method including collecting data relating to an event, predicting attendance at the event based on the collected data, predicting network usage based on the predicted attendance of the event, instantiating virtual network resources based on the predicted network usage, collecting post event data including actual attendance and network metrics, comparing the post event data with the predicted attendance and predicted network usage and updating a prediction algorithm based on the comparing step. The collecting data step may include collecting data relating to potential attendees at the event and a likelihood of attendance rating is given to one or more potential attendees wherein the method may further include compiling a listing of potential attendees based on the likelihood of attendance. In an aspect, the predicted network usage is based on predicting network usage of the potential attendees and which may be based in part on historical data relating to network usage of the potential attendees. In an aspect, the data relating to potential attendees at events is collected from one of text messages, social media posts or internet searches of the potential attendees. The method may include collecting data from a data collection system and wherein the data collection system includes one of a search engine system, a public discourse system, an emergency system and an environmental system. The collecting data step may collect data relating to the timing and location of the event and the method may further comprise correlating the timing data to determine a range of timing of the event. The method may further include traffic patterns in a vicinity of an event.

The present disclosure is also directed to a system including a data collection system configured to collect event data associated with an event, a predictive management system in communication with the data collection system and a master service orchestrator in communication with the predictive management systems; wherein the predictive management system includes an input-output interface, a processor coupled to the input-output interface wherein the processor is further coupled to a memory, the memory having stored thereon executable instructions that when executed by the processor cause the processor to effectuate operations including receiving data associated with the event from the data collection system, predicting attendance at the event based on the data associated with the event, predicting network usage at the event based on the predicted attendance, and causing network resources to be instantiated based on the predicting network usage step. The system may further include an event ending system in communication with the predictive management system, and wherein the operations further include receiving, from the event ending system, actual attendance at the event. In an aspect, the predictive management system includes a machine learning algorithm and wherein the operations further include comparing the actual attendance with the predicted attendance and the machine learning algorithm is updated based on the comparison.

In an aspect, the system may include an event ending system in communication with the predictive management system and wherein the operations further include receiving, from the event ending system, network performance metrics during a time and location of the event and wherein the predictive management system includes a machine learning algorithm and wherein the operations further includes comparing the network performance metrics with the predicted network usage and the machine learning algorithm is updated based on the comparison. In an aspect, the operations may further include receiving, from the event ending system, actual attendance at the event and wherein the operations further comprise correlating the actual attendance with the network performance metrics and the machine learning algorithm is updated based on the correlating step.

The data collection system may include an artificial intelligence module wherein the event data collected includes timing and location of the event and potential attendees of the event and wherein the event data relating to potential attendees comprises determining personalized information of one or more potential attendees and assigning a probability of attendance to the one or more potential attendees based on the personalized information.

The disclosure may also be directed to a system including a data collection system configured to collect event data associated with an event, a predictive management system in communication with the data collection system, the predictive management system configured to receive event data from the data collection system and to predict attendance at the event and network usage during the event, a master service orchestrator in communication with the predictive management systems, the master service orchestrator configured to receive the predicted network usage from the predictive management system and to instantiate resources based on the predicted network usage, an event ending system in communication with the predictive management system and the master service orchestrator wherein the event ending system is configured to collect network performance metrics during the event and actual attendance at the event and send the network performance metrics and the actual attendance to the predictive management system, and wherein the predictive management system is further configured to receive the network performance metrics and the actual attendance and wherein the predictive management system is adjusted based on the network performance metrics and the actual attendance This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 1b illustrates an exemplary functional block diagram of the external servers shown in FIG. 1a.

FIG. 1c illustrates and exemplary functional block diagram of the predictive management system shown in FIG. 1a.

FIG. 4a illustrates an exemplary flow diagram of an end-to-end process using the system of the present disclosure.

FIG. 4b illustrates an exemplary flow diagram of an attendance prediction process using the system of the present disclosure.

FIG. 4c illustrates an exemplary flow diagram of another embodiment of an attendance prediction process using the system of the present disclosure

DETAILED DESCRIPTION

Figure 1A:
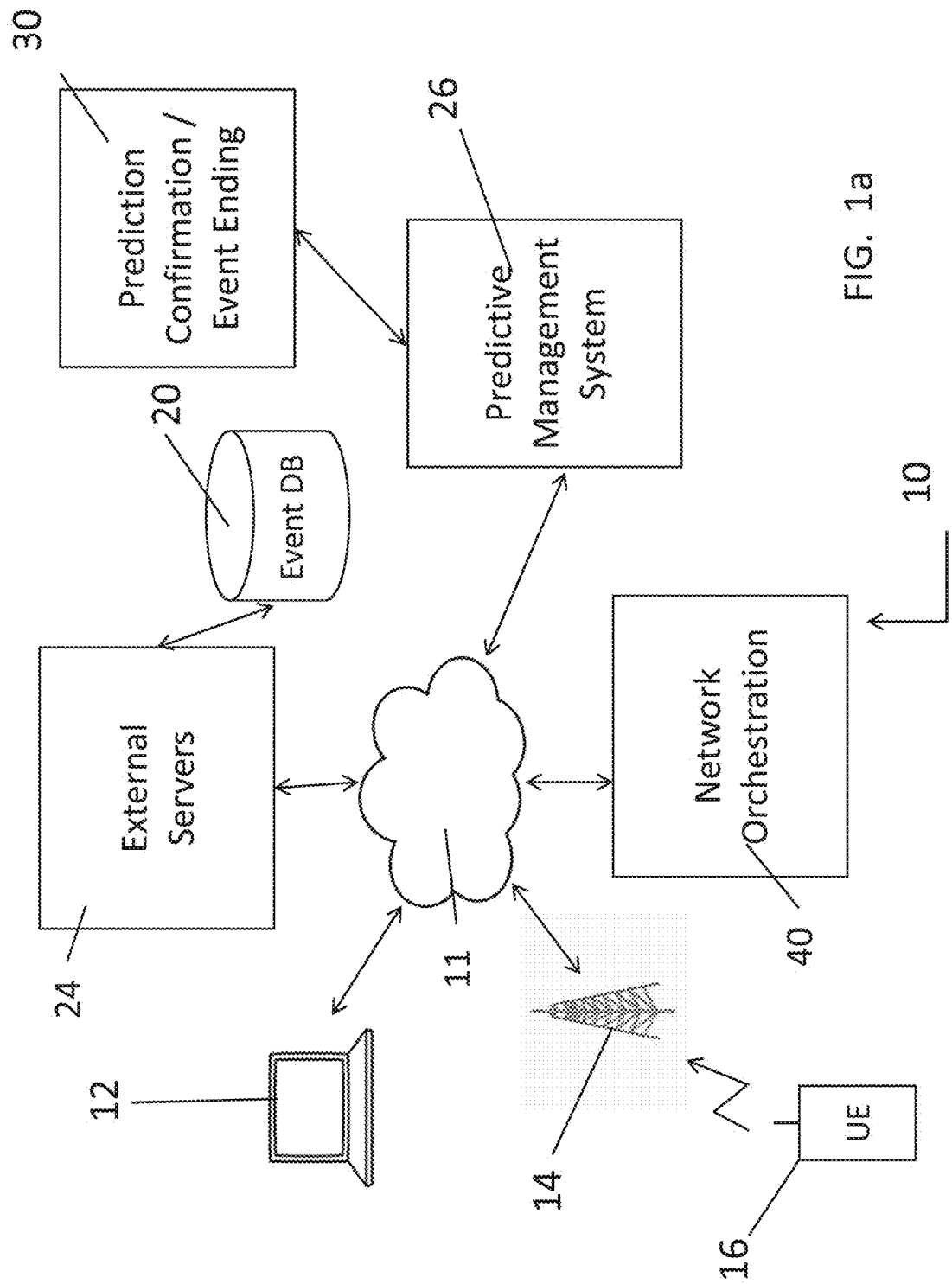
FIG. 1a illustrates an exemplary system architecture which may be implemented and utilized in accordance with the present disclosure.

System Overview. This disclosure is directed to a novel system and method that presents a complete multi-dimensional model to predict the usage type, such as video, file sharing, chatting social media interactions, and the like, geographical location of usage, anticipated numbers, and usage approximate durations. The accurate predication helps the carriers to plan for usage surges to spin up enough resources, i.e., virtual machines, at the proper locations to deliver uninterrupted service and achieve quality of service commitments at large scale events. As such, the system and method of the present disclosure provides a practical application for the novel management and use of virtual network resources and advances the state of technology in the telecommunications and software sectors.

The system and method of the present disclosure includes gathering raw data from a variety of sources, including but not limited to audio/video streaming and text files, messages, and chats. Key word searches may include identifying upcoming events such as concerts, sporting events games, parades, marches, festivals, and other scheduled events, as well as unplanned events such as emergencies, protests, marches, and other non-scheduled events. Unless otherwise specified, the term "events" will be used to refer to both scheduled and non-scheduled events. Other information relating to the events that may be gathered include, but are not limited to, the timing, duration and location of the event, available transportation to the events, including bus, train, automobile and foot traffic, and including routes and traffic patterns of the foregoing. The system and method of the present disclosure may also include an identification of the individuals that may attend. This may include likely demographics associated with the event, as well as identifying those individuals or groups who may have expressed interest in participating in the event. Data relating to such individuals may include usernames, screen names, device DNAs, mobile numbers, social media accounts, email addresses, and the like.

The system and method may also assign a probability to each demographic or potential participant of actually attending the event. For example, social media posts may reveal a participant as "Attending," "Possibly Attending," or "Not Attending." Additionally, internet searches and purchases of tickets and/or reservations may be gathered to assess the probability of attending.

This attendance projection process may be improved and adapted by machine learning algorithms. After each event, the actual attendance is observed by analysis of actual network usage, including but not limited to, number of connections made, sessions, and social media posts such as audio-video posts, comments, or discussion boards related to the personal accounts of event attendance. The system may correlate actual attendance versus the predicted attendance, accounting for circumstances such as weather during the event, holidays, unemployment rate in the region, demographics of actual attendees in the region, competing events, attendance history of the events in other locations and other data associated with the actual attendance.

In an aspect, data relating to an event may be gathered and categorized in accordance with the event, timing and location of the event. The list of potential attendees may be derived by correlating emails, usernames, phone numbers, and other user information to derive a unified list of potential attendees and the number of such potential attendees. For emergencies or spur of a moment events, check historical data for participation of similar events may be used. Otherwise, for planned events, historical data, for example data associated with learning via observing events and correlating actual numbers via cell phone signatures and predicted numbers may be used to predict actual numbers of attendees at the planned event. The system may have estimated that a set number of participants would attend, but only a percentage of that set number of participants did attend. The actual numbers may be correlated with other circumstances such as weather or other environmental factors. The actual number of attendees may be correlated based on predictions from various platforms. Different data input may be correlated to create unique potential participants profiles and/or demographic profiles.

Once the event has ended, a prediction confirmation and event ending function may be invoked. This function may be geographically aware of the event and routes leading to it so that it is able to correlate traffic variations with events, especially in smart cities where traffic patterns and density data are publicly available. This system is connected to the traffic information feed to check higher than usual traffic, both in terms of vehicle quantity and density to the event location as a means to validate the prediction. The system checks not only the vicinity but may also include an entire city and highway routes leading directly and/or indirectly to the event. The timing of the heavier traffic may also be verified. For example, heavier traffic toward the end of the event but before the official ending of an event may be an indication of a ball game being boring or one-sided, weather patterns became worse during the event, or other factors to be considered in future prediction scenarios.

Operating Environment. The system and method provided herein allows for the prediction of events to enable service providers to anticipate the networking demands of events and to spin up the virtual network resources in and around the location of the event and traffic routes leading to the event to provide quality service to those attending the events and to those otherwise impacted by the events. As such, the disclosure provides a practical application of a method that also advances the state of telecommunications technology.

With reference to FIG. 1a, there is shown a system 10 in which the present disclosure may be implemented. The system 10 may include an input device 12 which may, for example, be a desktop or laptop computer. The input device 12 may be used by an individual to communicate with others through social media, emails, or other systems and to search for and purchase tickets to events in a geographic area. The input device 12 has access to a network 11 which may, for example, be an Internet Protocol/Multiprotocol Label Switching (IP/MPLS) converged network. The disclosure is applicable to any type of network 11, including but not limited to any type of wireless communication network, including 3G, fourth generation (4G)/LTE, fifth generation (5G), and any other wireless communication network, an optical fiber network, a public switched telephone network ("PSTN"), a wide-area local area network ("WLAN") and may, for example include virtual private network ("VPN") access points, Wi-Fi access points, and any other access points capable of interfacing with the network 11, along with any combinations of the foregoing. It will be understood by those skilled in the art that while the network 11 may comprise the afore-mentioned networks, a combination of one or more communication networks may be used.

Alternative input devices represented by mobile user equipment 16 such as a smart phone, tablet, PDA or other portable user device in communication via a cellular or other wireless system, represented by cell tower 14, may also be used. Each of the input devices 12, 16 is in communication with external servers 24 and an event database 20 through network 11.

The UE 16 may, for example, be a smartphone, tablet or personal computer configured with an operating system which may, for example, be one of Apple's iOS, Google's Android, Microsoft Windows Mobile, or any other smartphone operating system or computer operating system or versions thereof. The UE 16 may control user input functions, including, but not limited to, selection and control of inputs to system 10 and receipt of outputs from system 10. The UE 16 may provide the ability for a user to input billing information, profile information, emergency contacts, or other inputs that enable or personalize the functions available to a user. The UE 16 may include local client software for communication with external servers 24 describer in more detail below.

To communicate with the network 11, the UE 16 may have a communication interface for a wireless or wired communication system, which may, for example, be Wi-Fi, Bluetooth®, 3G, 46 LTE, and 5G, WiFi, LAN, WiLan or any other wireless communication system. The UE 16 may be in communication through any of the above-identified systems.

The functionality embedded and described in the disclosure may reside either on the UE 16 or external servers 24 or a combination thereof. Any such designation of functionality between the UE 16 and external servers 24 may be a design choice or based on user experience, performance, cost, or any other factor. The allocation of functionality is exemplary only and non-limiting in scope of the present disclosure. Such external servers 24 may include social media platforms, communication platforms, or any other platforms that may be related to events, public transportation, sales, parking, scheduling, or any sources of interest to subscribers. Each of the servers may employ artificial intelligence or machine learning algorithms to analyze data collected and used by system 10. Unless otherwise specified, the terms "artificial intelligence" and "machine learning" will be used interchangeably herein. It will be understood by those skilled in the art that such external servers 24 may supply data to the UE 16 as well as receive data from the UE 16.

There is also shown an event database 20 which may be accessed through external servers such as a server operated by a venue, promoter, ticket seller, or the like. Users may access the event database 20 through external servers 24 using either a laptop computer 12 or UE 16 or may directly access the event database 20.

Figure 1B:
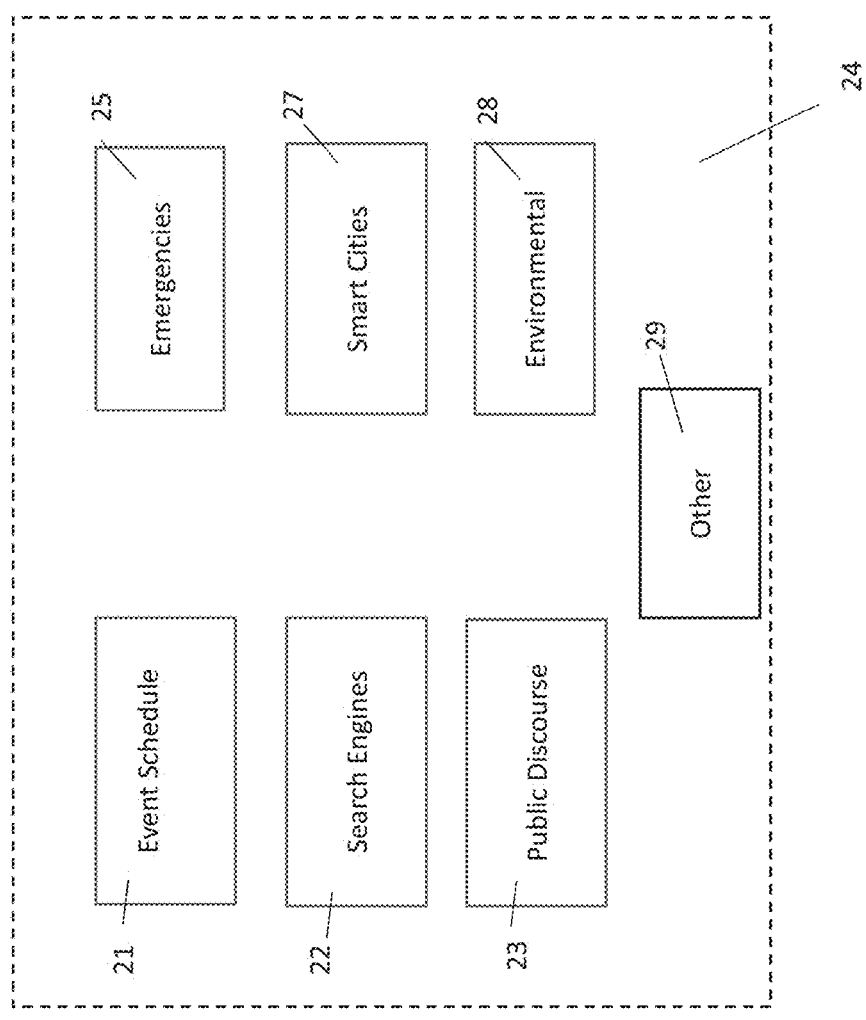

External Servers. An exemplary group of external servers 24 is shown in FIG. 1b. The role of the external servers 24 may include the gathering of raw data, which may, for example, be captured from audio and video streaming, and text files, messages, chat rooms and pertain to certain information relating to events. The external servers may also capture key word searches to capture information relating to events, which may include, but are not limited to, concerts, games, parades, marches, festivals, emergencies, and other events in which a larger number of users may congregate for a period of time. The external servers 24 may capture information relating to the timing and duration of the events, and the location and route(s) leading to the event. The external servers 24 may also identify individuals who may have expressed interest in participating in the event, such identifying information including usernames, screen names, device DNAs, phone numbers, and emails. The external servers 24 may also gather information relating to the certainty level of individual participation by assigning a probability to each potential participant of actually attending the event. For example, in social media events, potential participants may indicate that they are either "Attending," "Not Attending," or "Maybe Attending" the event. In addition, to the extent that individuals searched for certain events, the level of activity may be captured. For example an individual who proactively searched for an event, clicked through to deeper webpages associated with the event, made reservations or investigated the location of and directions to the event may show a higher probability of attending than an individual who simple received an email or solicitation based on a mailing list.

Using machine learning algorithms in the external servers 24, actual attendance projection processes may be learnable and adaptable. After each event, the actual attendance may be observed by number of connections made, communication sessions initiated, and social media posts which may, for example, include pictures, videos, or commentary about the event. That information may be correlated with the individuals that presented a higher likelihood of attendance to identify actual attendees or groups of attendees. Thus, the system and method may correlate actual attendance with individuals who had previously expressed an interest in attending. Those correlations may be saved and learned for predicting attendance at the next events.

Additionally, the external servers 24 may account for circumstances surrounding the event itself. For example, the weather during the event, holidays around the date of the event, unemployment rates in the particular area, competition of a particular event with other events happening about the same time or in the same geographical area, and the history of an event in other locations, which for example, may include the history of a concert tour entering Atlanta that may collect and analyze information from that same concert tour for stops in comparable cities such as Chicago or Dallas.

With reference to FIG. 1b, there is shown a representative example of external servers 24. It will be understood that these external servers are exemplary only and other servers may be incorporated into the present disclosure and not all the servers represented in FIG. 1b are required. Additionally, while the servers of FIG. 1b are shown as stand-alone servers, it will be understood that functionality may be consolidated on fewer servers or spread across multiple servers.

Event Schedule Server. There is shown an event schedule server 21 whose functionality may include, for example, accessing an event database 20, and compiling and analyzing the news & social media associated with events. The event schedule server 21 may include artificial intelligence or machine learning algorithms that monitors the news and social media public posts, both audio-video and textual posts, for events, announcements, locations, and timing of the events and creates an estimate of actual numbers expected to attend the event. This estimate of attendance may be calculated based on a learned percentage of conversations indicating interest based on history of attendance of similar events. For example, an Atlanta concert may show that historically, forty percent of individuals that showed an interest in a similar concert, i.e., a concert by the same artist or a concert associated with a particular music genre, actually attend. The event schedule server 21 may identify individuals as "attending," "possibly attending" and "not attending" and assign different probabilities for attending the event. For example, more weight towards attending may be given to those individuals who share information about the event with others and/or are actively discussing the event on social media or internet forums or ask questions about the event. Less weight may be given to those individuals who are merely receiving information about the event.

Search Engine Server. Search engine server 22 may, for example, include one or more search engines such as Google®, Bing® or other search engines which compile and analyze search terms such as destination reservations, ticket inquiries, event material or other details. The analysis may look for spikes in such searching that would indicate interest in a particular event. For example, a search engine server 22 may collect and analyze search term feeds and apply analytics to those feeds, including artificial intelligence or machine learning algorithms, to flag out-of-the-ordinary or spiked interests in searching for certain destinations, events, or other activities in proximity to certain areas or events including pre-event or post-event receptions. The search engine server 22 may also compile information relating to ticket purchases or accommodations. The searched parameters may be tied to the event, location, timing, ancillary events and the like. The search engine server 22 may also compile data associated with the demographics of the searcher and provide an approximate count with assigned weights of likelihood of attending, either individually or as a group or particular demographic, which may, for example distinguish between reading something on a feed, affirmative searching with a simple click or a deeper searching through multiple clicks and sites associated the event.

Public Discourse Server. Public discourse server 23 may include functionality that, for example, collects and analyzes public chat and text messages and/or event forums. This discourse may include group chats, Facebook® groups, Nextdoor local neighborhood groups or other social media, and other discussion forums.

Emergency Server. Emergency server 25 may monitor news and other sources such as emergency alert systems to collect and analyze emergency data. Artificial intelligence or machine learning algorithms may assess and predict the effect that an emergency may have on attendance at an event. This may be based on historical data with respect to the type of emergency, the type of event, including the time, day, location, and significance of the event. For example, historical data with respect to an emergency in the general location of the Super Bowl may show that most potential attendees would work through the relative minor emergencies such as a traffic accident or a house fire and still attend the Super Bowl, so the attendance prediction may be unchanged. However, if the emergency involved is a bridge collapse that made travel to the venue more difficult for some, the attendance prediction would likely fall by a certain percentage of attendees. Conversely, if there was a relatively minor event such as a high school baseball tournament, even a relatively minor emergency may impact the predicted attendance at the baseball tournament. Thus, the emergency server 25 may analyze the predicted or actual emergency, the severity of the emergency, the location of the emergency, the location of the event, the size of the event and the relative importance of the event to determine the effect, if any, the emergency may have on attendance.

Smart City Server. A smart city server 27 or similar type server may monitor, collect and analyze real time or near real time data relating to car or foot traffic and the direction thereof and to correlate that data to a particular destination or destinations. The smart city server 27 may use internet of things data connections to monitor and collect such data. The analysis may be performed by artificial intelligence or machine learning algorithms which may detect activity such as foot or vehicle traffic density which is outside of a normal range and correlate that to the one or more destinations. As such, smart cities server 27 may provide functionality that, for example, will collect and analyze higher than usual car or foot traffic, directional analysis of such traffic, and correlate to destinations that may be associated with an event. Historical data captured from a smart city server 27 may be used to train or evolve the machine learning algorithm.

Environmental Server. An environmental server 28 may monitor, collect and analyze data related to daily weather and geographical weather patterns, seasons, political climate and tensions, economical climate, and other factors to determine what, if any, effect such environmental factors may have on attendance at events. The environmental server 28 may correlate attendance levels and behavioral changes due to such environmental factors in view of the event. For example: if rain is predicted for an outdoor major league baseball game, it may be shown historically that only about 70% of ticketed individuals may actually attend the game, whereas closer to 100% would attend an outdoor NFL game with similar weather predictions. Not only the type of event, but other factors such as the identity of the competing teams may affect the predicted attendance. For example, a good game between two top rivals with a poor weather forecast may indicate a higher predicted attendance as opposed to a lesser game between two poor teams with the same weather forecast.

Other Servers. The above list of external servers 24 is exemplary only and therefore other servers 29 are possible. It will be understood that other data monitoring, collection and analysis servers may be developed and/or deployed as a component of the system 10 of the present disclosure. It will also be understood that not all of the external servers 24 mentioned above are necessary for the system 10 to operate.

Figure 1C:
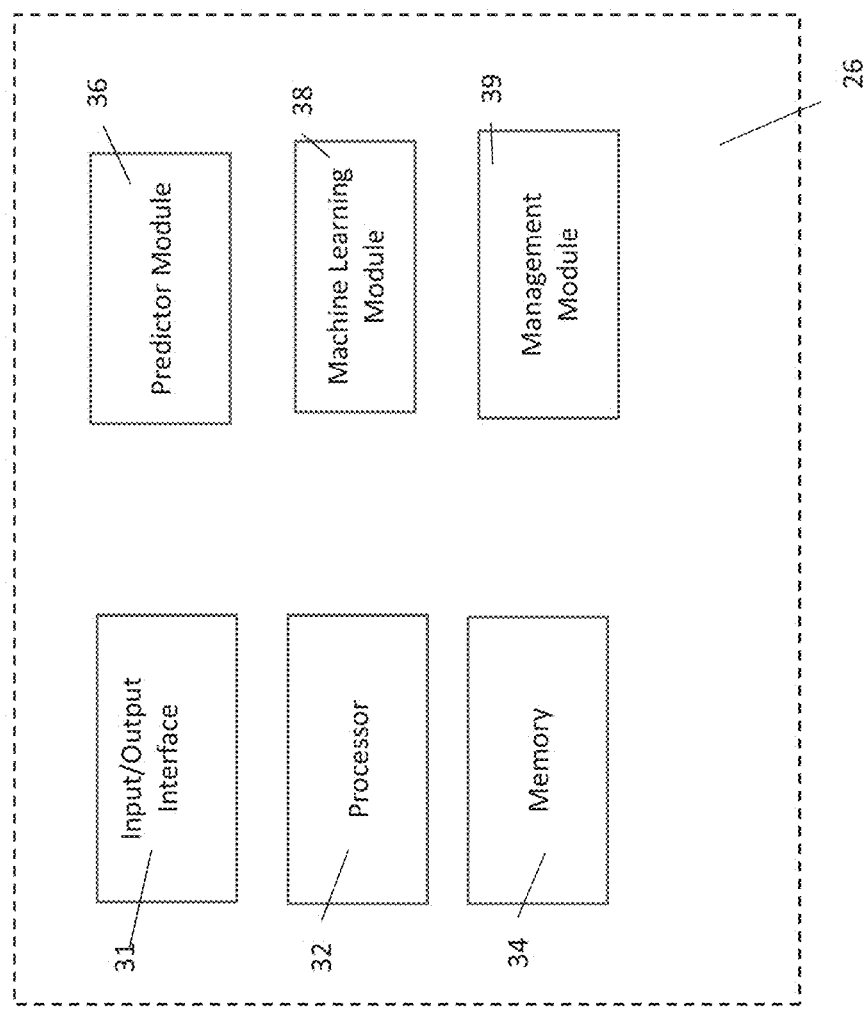

Predictive Management System. With reference to FIG. 1c, there is shown an exemplary functional block diagram of a predictive management system 18 constructed in accordance with the present disclosure. The predictive management system 18 considers the various data feed to derive an event, location of the event, timing of the event, the approximate number of attendees and the types of data profiles of the likely attendees. The predictive management system 18 may receive inputs from the various external servers 24. The predictive management system 18 may create separate buckets of information which may, for example, be based on the event, the timing of the event and the location of the event. The predictive management system 18 may reconcile timing to the extent that the external servers 24 collected data from various sources showing a range of timing and may, for example, select wider range of timing as most important. The predictive management system 18 may consolidate the list of potential number of attendees via correlating emails, usernames, phone numbers and other information to derive a unified list of attendees. The predictive management system 18 may account for emergencies or spur of a moment events. Historical data, such as that acquired through observing events and correlating actual numbers via cell phone signatures with the predicted numbers may be used to predict the number of expected attendees. For example, the system may estimate that there will be number of participants but only a percentage of that number actually attend. Those actual numbers may be correlated with other circumstances such as weather.

The predictive management system 18 may compute a network usage estimate based on one or more inputs from the external servers 24. The predictive management system may include a predictor module 36 and a machine learning module 38. Also shown is an input/output interface 30, a processor 32 and a memory 34, wherein the memory may include programming instructions that when executed by the processor, cause the predictive management system 18 and the system 10 to perform certain functions as described in further detail below.

The input/output interface 31 may provide access to the network 11 by the predictive management system 18. The input/output interface 31 may also interface directly with the prediction confirmation/event ending module 30, described in further detail below. The machine learning module 38, for example, be initial trained on a database comprising historical attendance at events and the increased loading on the network based on those events. The machine learning module 38 may also be trained with the amount of network resources required to service the increase demands on the network. Once trained, the machine learning module 38 will continue to receive data inputs from the external servers 24 and, working with the predictor module 36, predict the anticipated loading on network 11 during the event based on the predicted attendance. As more events are processed and the historical basis is verified, the machine learning module 38 may become more advanced and be able, together with predictor module 36, to predict the increased demand on the network, both in terms of processing capacity and location of that processing capacity.

Prediction Confirmation/Event Ending. The machine learning module 38 may also receive feedback from the prediction confirmation/event ending module 30. This prediction confirmation/event ending module 30 may be geographically aware of the event and routes leading to it and may, for example, correlate traffic variations with events. Applications such as Smart Cities may make traffic patterns and traffic density available. The system may be connected to live traffic information data feeds to check higher than usual traffic to the event location to assess the accuracy of the prediction. The system may check not only the vicinity but the entire city and highway routes leading, directly and indirectly, to the event. For example, the traffic may get heavier towards the end of the event in a direction leaving the event site to signal that people are actually leaving which may be well before the official ending of the event. That may happen if, for example, the game is boring, the weather is getting worse than expected, and other factors.

The prediction confirmation/event ending module 30 may, for example, assess the quality of service that was provided at the conclusion of the event and analyze that quality of service based on the predicted and actual attendance at the event, the predicted and actual location of the event, and the other factors that were used from the external servers in formulating the prediction of required resources. The prediction/confirmation module 30 may also collect data associated with the event itself, such as scores, weather interference, and other data that may impact the timing of the increases and decreases in traffic volumes. By this feedback loop, the machine learning module 38 within the predictive management system 18 may be further refined so that the loading demands for the next event may become even more accurate.

The predictor module 36 may use the outputs of the machine learning module 38 in view of the inputs from the external servers 24 to predict the loading of the network 11 based on the events, including the timing and locations of such loading on the network 11, For example, the predictor module 36 may determine that extra VMs relating to RAN functionality and EPC core functionality are required for a period of time surrounding the event and at a particular location of the event. If the event is a game or a concert, the location may be static. If the event is a parade, the location may be dynamic, resulting in a demand for resources that is both time and location based such that the system 10 predicts rising and falling of demand at a particular location while the rise and fall of the demand at the next location is based on the speed of the event.

Figure 2:
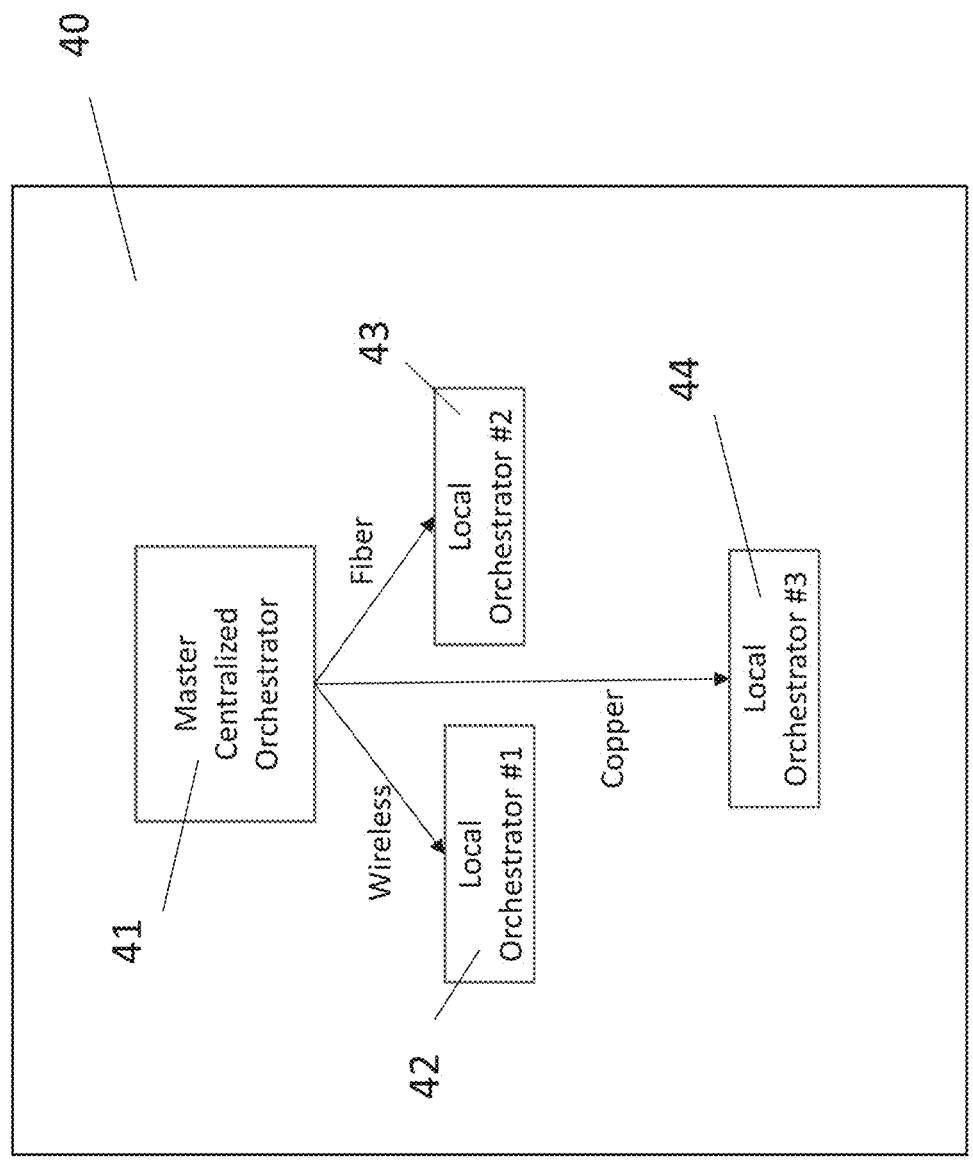
FIG. 2 illustrates an exemplary control architecture for a network managed in accordance with the current disclosure.

The prediction of demand may then be passed through the network 11 or directly to an interface with the network orchestration module 40. With reference to FIG. 2, there is shown an exemplary architecture of a network orchestrator 40 having a master centralized orchestrator 41 in communication with various networks and network components. The centralized orchestrator receives the predicted load, timing and location and controls the instantiation of the VMs desired to meet the predicted load during the time and location of the event. There are shown three local orchestrators, local orchestrator #1 42, local orchestrator #2 43 and local orchestrator #3 44, which may, for example, represent the control and capacity of wireless networks, fiber optic networks and landline copper PSTN networks, respectively, such that the VMs to be instantiated in the wireless network will be done in consideration of other network resources that may be available.

Figure 3A:
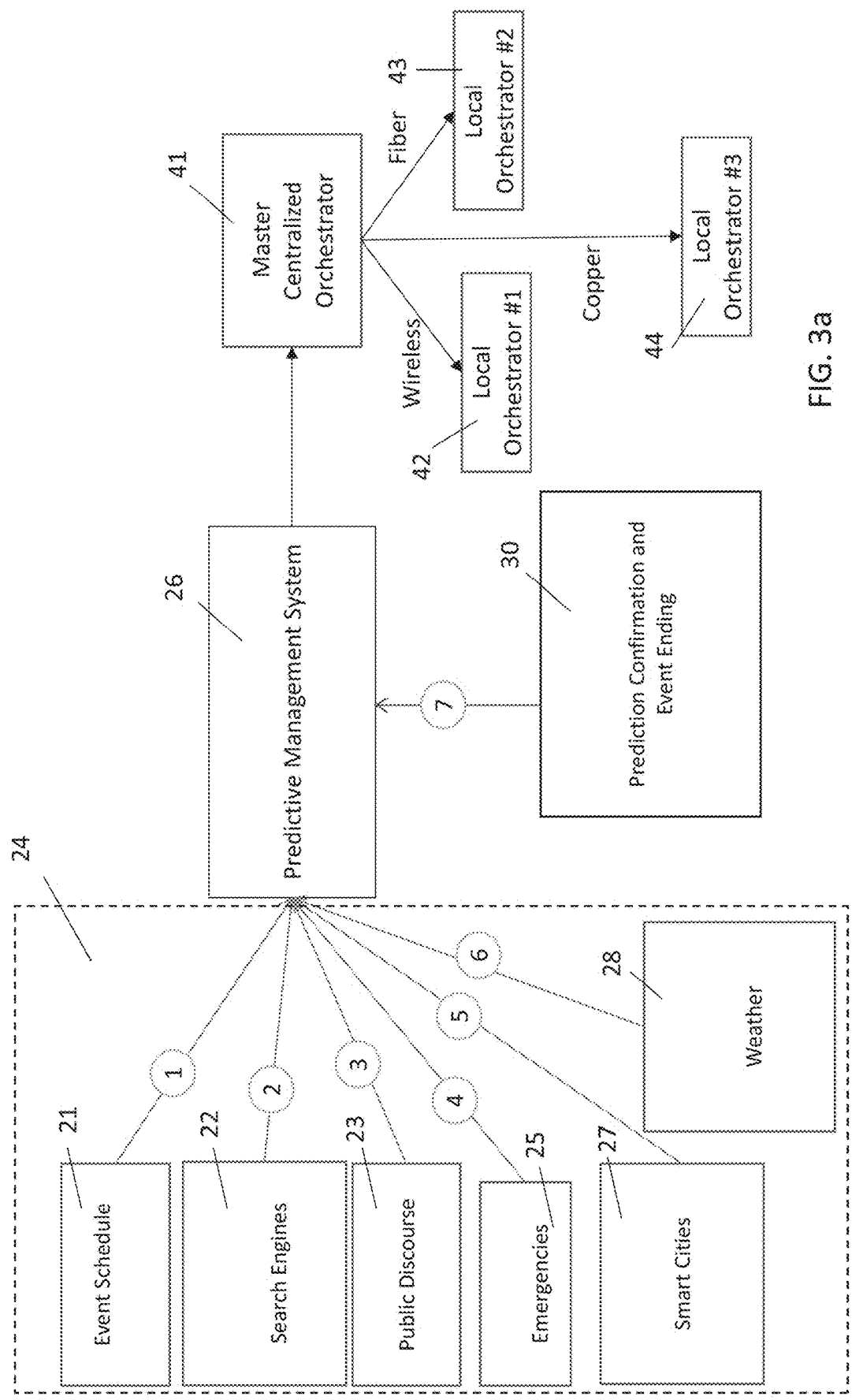
FIG. 3a is an exemplary system architecture of a local event and data flow diagram of a system in accordance with the present disclosure.

FIG. 3a shows an exemplary data flow in a system as it may be directed to a local prediction system in the vicinity of an event. Arrows 1 through 6 illustrate the inputs from the external servers 24 described above into the predictive management system 26. Also shown is input arrow 7 from the prediction confirmation and confirmation ending module 30 which provides the feedback into the predictive management system 26 for the machine learning algorithms. The output of the predictive management system 26 may then be fed into the master centralized orchestrator 41 to provide the resources at the event that are predicted to be needed in order to for a service provider to provide superior quality of service to users at the event.

Figure 3B:
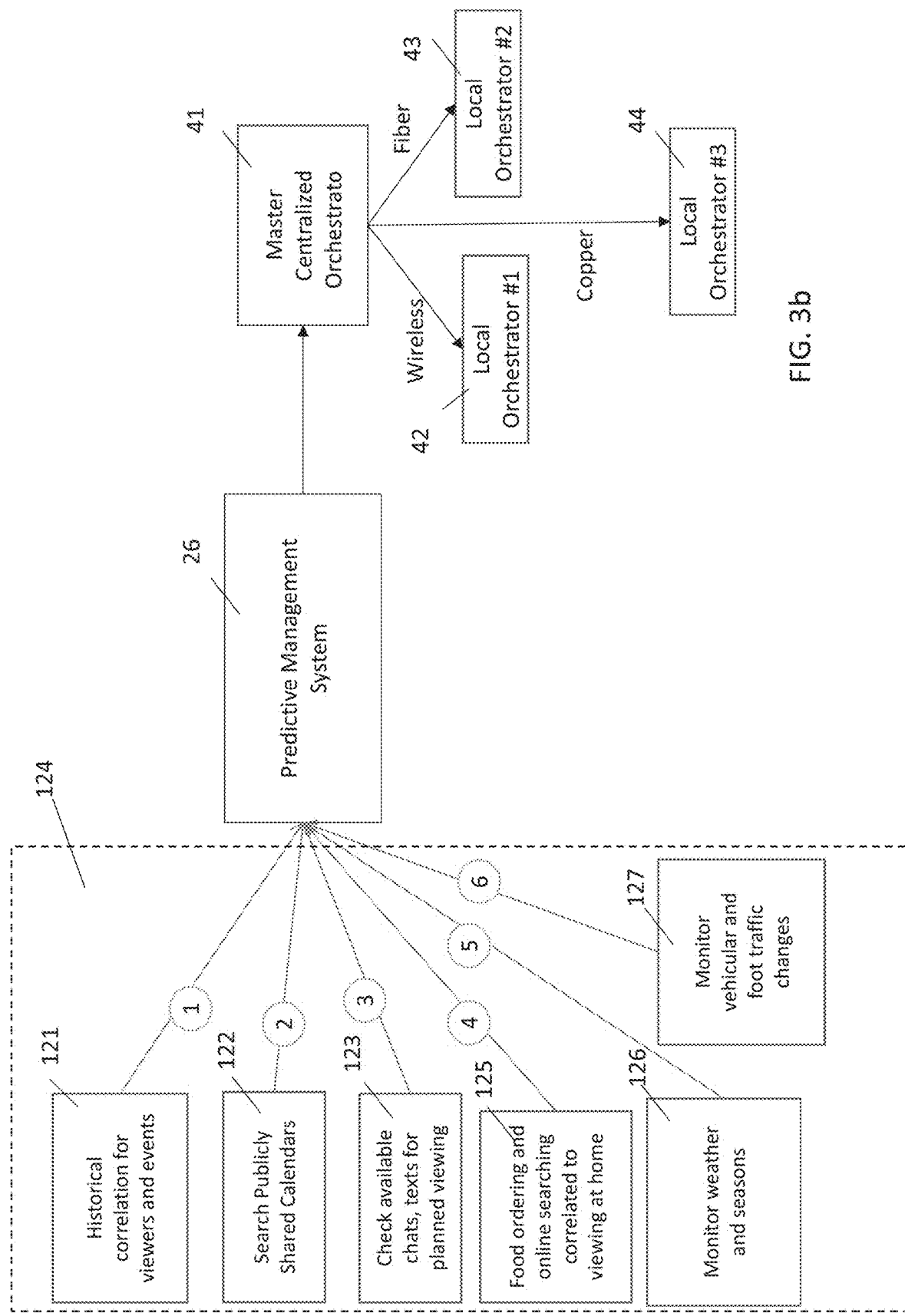
FIG. 3b is an exemplary system architecture of a remote environment and data flow diagram of a system in accordance with the present disclosure

An alternative embodiment of the data flow of system of the present disclosure is shown in FIG. 3b. This embodiment may consider the effect of an event remote from the location of the event. For example, as an alternative to attending the event, some potential attendees may make alternative arrangements to participate in the event by organizing watch parties and ordering takeout food. If weather is a factor, then the remote participation may be in lieu of attending in person. If the event is sold out, such as a Super Bowl, then the remote participation may be in addition to the projected attendance at the event itself. Regardless, the remote attendance may also have an impact on network traffic that may be addressed.

The data flow is shown by arrows 1 through 6 from external servers 124 to the predictive management system 26. In this case, the exemplary external servers may provide functions such as historical correlation for viewers and events 121, a search of publicly available calendars 122, check texts for planned viewing 123, food ordering and online searching relating to watching remotely 125, monitor weather and seasons 126, and monitor vehicular and foot traffic 127. It will be understood that the remote and local systems may work independently or together, with the latter providing a prediction of required network resources for the event in and around the location of the event and at various locations remote from the event.

Methods of Use. With reference to FIG. 4a, there is shown an exemplary flow diagram of processing by a system constructed in accordance with the present disclosure. At 200, data surrounding an event is gathered, which may for example, be gathered through artificial intelligence algorithms running on external servers 24. At 201, attendance at the event is predicted. At 202 the amount of network resources needed for the event is determined. At 203, the network resources are scheduled and instantiated by a master service orchestrator 40. These network resources may be in the form of a software defined network in which a variety and multiple virtual machines are spun-up on generic hardware resources at or near the location of the event in or around the time of the event to provide network services to attendees at the event at a quality of service level that is acceptable to the attendees. At 205, post event data is gathered to determine the accuracy of the predicted attendance and to analyze whether external events such as weather or an emergency affected the actual attendance. At 206, the machine learning algorithms receive feedback and use the feedback to refine the accuracy of the machine learning algorithms to be used for the prediction of attendance at a future event.

With respect to 4b, there is shown an exemplary flow diagram in which the prediction of the number of attendees is made. At 210, data from the external servers are catalogued in terms of the event, the timing of the event, and the location of the event. At 221, the timing of the event is reconciled which may, for example, consider the possible timing of the event based on inputs from the external servers and selecting a range of timing for the event. The range may be for the event itself or may also be for pre-game events such as tailgating before a game, dinners before a show, travel to the game, and other pre-game events that may cause an increase in the number of users at the location which would require additional resources to be needed. The timing range may also include post-game activities as well.

At 222, a list of potential attendees may be consolidated to a list based on the multiple lists that may have been created by one or more of the external servers. At 223, the number of attendees in and around the event is predicted. That prediction may include the number of individuals attending the event and may include the number of individuals that want to experience the environment, such as a pre-game environment, surrounding the event. At 224, the actual attendees are determined, and such attendees are correlated to one or more particular platforms that identified those attendees as potential attendees. For example, one attendee may have been predicted based on on-line searching while another may have been predicted based on social media posts and messages.

With respect to FIG. 4c, there is shown another exemplary flow diagram that may be used in accordance with the system of the present disclosure. At 210, raw data relating to the event is obtained. Such raw data may be determined by artificial intelligence algorithms associated with the external servers. At 211, the event data is received by the event prediction model and parsed into various categories which may, for example, include event data, timing of event data, and the location of the event data. At 212, the population of potential attendees is determined. At 213, each of the potential attendees is assigned a probability of attending the event. At 214, post event data is gathered and fed back into the event prediction module. At 215, data associated with circumstances surrounding the event, such as weather, an emergency, a lop-sided game, or some other circumstantial data, are applied to the post event data. At 216, the post event data with the circumstantial data applied are fed back into the machine learning algorithm for use in a future event.

It will be noted that the post event data may also include an analysis of the network performance during the event based on the actual attendance and circumstances surrounding the event. For example, if the network accessibility, latency, speed, or other metrics were affected by the number of attendees and/or the type of access, such as live streaming or social media postings, then that data may be input into the machine learning algorithms for use in the next prediction of resources. As such, the machine learning component of the prediction module will not only learn to better predict attendance at the events, but also will learn to better predict the amount of resources and the location of resources to be allocated to the event.

As can be seen from the foregoing examples, this disclosure and the appended claims provide a practical application that ensures that an event with increased network users will have sufficient network resources to maintain an acceptable or superior level of service at the time and location that those network resources are needed.

Figure 5:
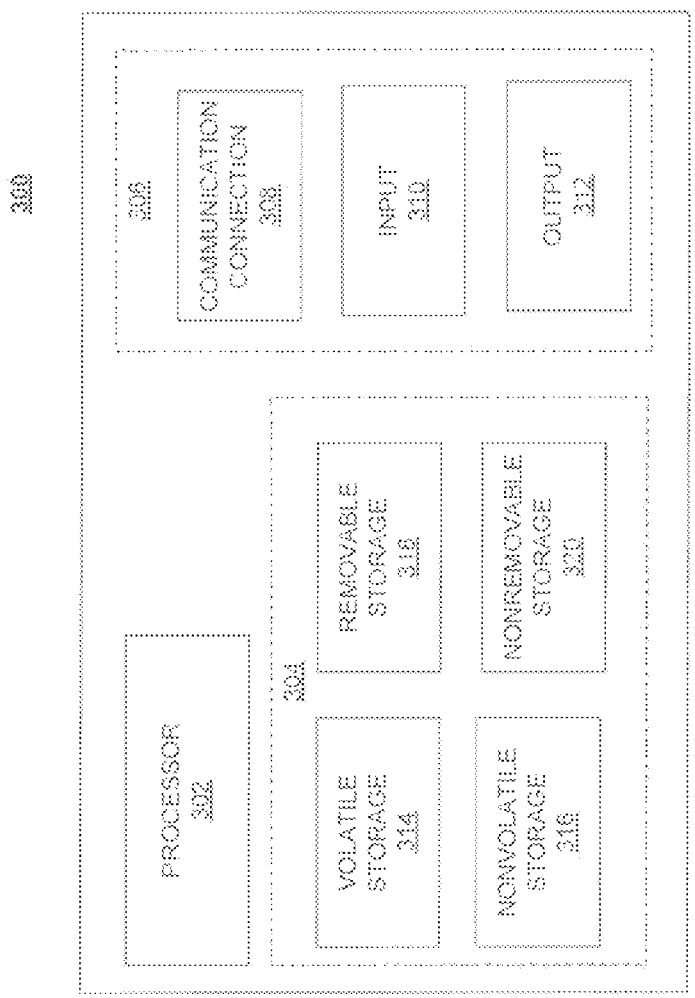
FIG. 5 illustrates a schematic of an exemplary network device.

Network Description. FIG. 5 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media.

By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
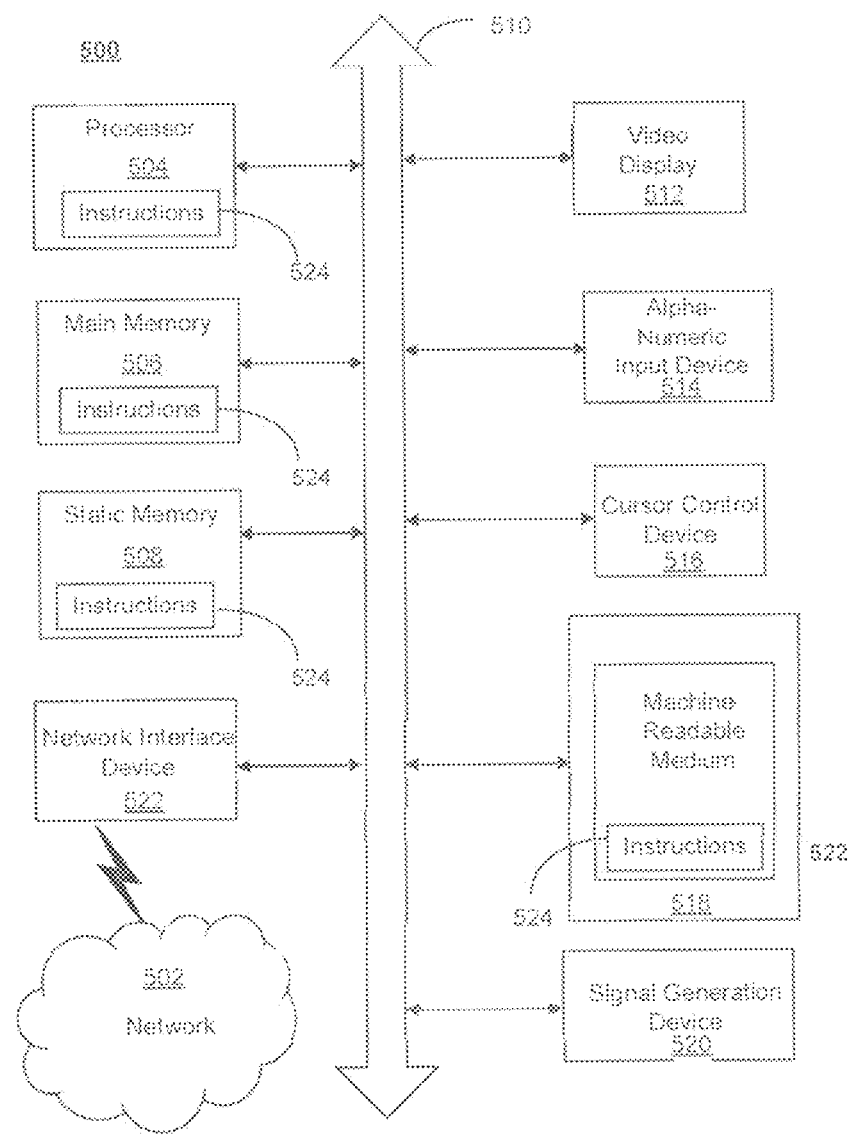
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (JOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
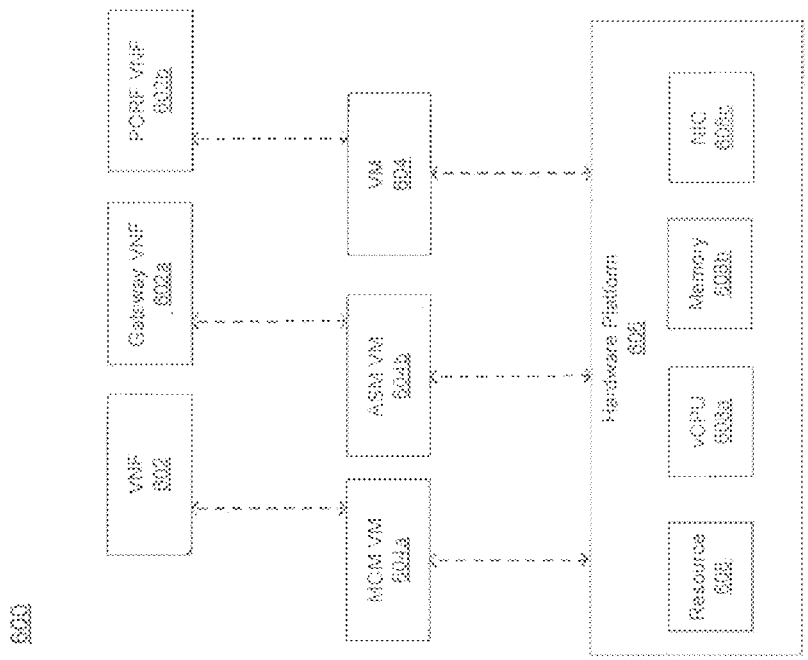
FIG. 7 is a representation of an exemplary network.

FIG. 7 is a representation of an exemplary network 600. Network 600 (e.g., network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7 illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7 illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 8:
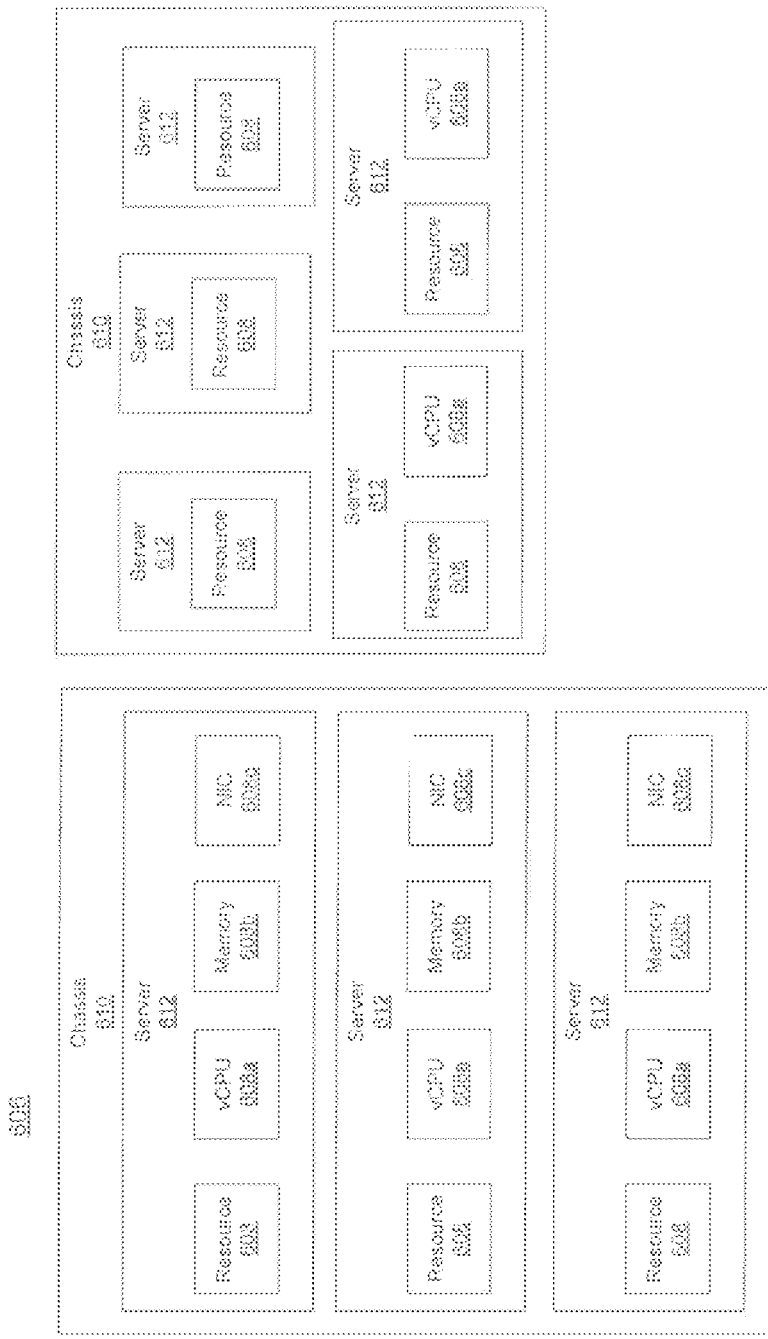
FIG. 8 is a representation of an exemplary hardware platform for a network.

While FIG. 7 illustrates resources 608 as collectively contained in hardware platform 606, the configuration of hardware platform 606 may isolate, for example, certain memory 608c from other memory 608c. FIG. 8 provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 8 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604*a* be instantiated on a particular server 612 that does not contain any ASM VMs 604*b*. As another example, an anti-affinity rule may require that MCM VMs 604*a* for a first VNF 602 be instantiated on a different server 612 (or chassis 610) than MCM VMs 604*a* for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602*a* and PCRF VNF 602*b*. Gateway VNF 602*a* may require five VMs 604 instantiated on the same server 612, and PCRF VNF 602*b* may require two VMs 604 instantiated on the same server 612. (Assume, for this example, that no affinity or anti-affinity rules restrict whether VMs 604 for PCRF VNF 602*b* may or must be instantiated on the same or different server 612 than VMs 604 for gateway VNF 602*a*.) In this example, each of two servers 612 may have sufficient resources 608 to support 10 VMs 604. To implement sessions using these two servers 612, first server 612 may be instantiated with 10 VMs 604 to support two instantiations of gateway VNF 602*a*, and second server 612 may be instantiated with 9 VMs: five VMs 604 to support one instantiation of gateway VNF 602*a* and four VMs 604 to support two instantiations of PCRF VNF 602*b*. This may leave the remaining resources 608 that could have supported the tenth VM 604 on second server 612 unused (and unusable for an instantiation of either a gateway VNF 602*a* or a PCRF VNF 602*b*). Alternatively, first server 612 may be instantiated with 10 VMs 604 for two instantiations of gateway VNF 602*a* and second server 612 may be instantiated with 10 VMs 604 for five instantiations of PCRF VNF 602*b*, using all available resources 608 to maximize the number of VMs 604 instantiated.

Consider, further, how many sessions each gateway VNF 602*a* and each PCRF VNF 602*b* may support. This may factor into which assignment of resources 608 is more efficient. For example, consider if each gateway VNF 602*a* supports two million sessions, and if each PCRF VNF 602*b* supports three million sessions. For the first configuration—three total gateway VNFs 602*a* (which satisfy the gateway requirement for six million sessions) and two total PCRF VNFs 602*b* (which satisfy the PCRF requirement for six million sessions)—would support a total of six million sessions. For the second configuration—two total gateway VNFs 602*a* (which satisfy the gateway requirement for four million sessions) and five total PCRF VNFs 602*b* (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
  collecting, by a processing system including a processor, data relating to an event, wherein the data relating to the event includes a listing of potential attendees and historical wireless communication network usage of the potential attendees;
  predicting, by the processing system, attendance at the event based on the collected data;
  predicting, by the processing system, wireless communication network usage based on the predicted attendance of the event and the historical wireless communication network usage of the potential attendees;
  instantiating, by the processing system, virtual network resources based on the predicted wireless communication network usage;
  collecting, by the processing system, post event data including actual attendance and post event wireless communication network metrics, wherein the actual attendance is observed by analysis of the post event wireless communication network metrics;
  comparing, by the processing system, the post event data with the predicted attendance and predicted wireless communication network usage; and
  updating, by the processing system, a prediction algorithm based on the comparing step.

2. The method of claim 1 wherein the collecting data step includes collecting data relating to determining personalized information of the potential attendees.

3. The method of claim 1, further comprising:
  assigning weights of likelihood of attendance to one or more potential attendees, wherein the weights of likelihood of attendance are based at least in part on internet searching behavior of the one or more potential attendees; and
  compiling the listing of potential attendees based on the weights of likelihood of attendance.

4. The method of claim 3 wherein the predicted wireless communication network usage is based on predicting wireless communication network usage of the potential attendees.

5. The method of claim 4 wherein the predicted wireless communication network usage includes predicted usage type and predicted usage duration.

6. The method of claim 1, further comprising collecting, by the processing system, data relating to potential attendees from one of text messages, social media posts or internet searches of the potential attendees.

7. The method of claim 1 wherein the collecting step includes collecting data from a data collection system.

8. The method of claim 7 wherein the data collection system includes one of a search engine system, a public discourse system, an emergency system and an environmental system.

9. The method of claim 1 wherein the collecting data step collects data relating to the timing and location of the event.

10. The method of claim 9 further comprising correlating, by the processing system, the timing data to determine a range of timing of the event.

11. The method of claim 9 further comprising determining, by the processing system, traffic patterns in a vicinity of an event.

12. A system comprising:
  a data collection system configured to collect event data associated with an event;
  a predictive management system in communication with the data collection system; and
  a master service orchestrator in communication with the predictive management system;
  wherein the predictive management system comprises:
  an input-output interface;
  a processor coupled to the input-output interface wherein the processor is further coupled to a memory, the memory having stored thereon executable instructions that when executed by the processor cause the processor to effectuate operations comprising:
    receiving data associated with the event from the data collection system, wherein the data associated with the event includes a listing of potential attendees and historical wireless communication network usage of the potential attendees;
    predicting attendance at the event based on the listing of potential attendees;
    predicting wireless communication network usage at the event based at least in part on the predicted attendance and the historical wireless communication network usage of the potential attendees; and causing virtual network resources to be instantiated based on the predicting network usage step.

13. The system of claim 12 further comprising an event ending system in communication with the predictive management system, and wherein the operations further comprise receiving, from the event ending system, actual attendance at the event.

14. The system of claim 13 wherein the predictive management system includes a machine learning algorithm and wherein the operations further comprises comparing the actual attendance with the predicted attendance and the machine learning algorithm is updated based on the comparison.

15. The system of claim 12 further comprising an event ending system in communication with the predictive management system and wherein the operations further comprise, receiving, from the event ending system, wireless communication network performance metrics during a time and location of the event.

16. The system of claim 15 wherein the predictive management system includes a machine learning algorithm and wherein the operations further comprises comparing the wireless communication network performance metrics with the predicted wireless communication network usage and the machine learning algorithm is updated based on the comparison.

17. The system of claim 16 wherein the operations further comprise receiving, from the event ending system, actual attendance at the event and wherein the operations further comprise correlating the actual attendance with the wireless communication network performance metrics and the machine learning algorithm is updated based on the correlating step.

18. The system of claim 12 wherein the data collection system comprises an artificial intelligence module and wherein the event data collected includes timing and location of the event.

19. The system of claim 18 wherein the event data relating to the listing of potential attendees comprises determining personalized information of one or more of the potential attendees and assigning a probability of attendance to the one or more of the potential attendees based on the personalized information.

20. A system comprising:
a data collection system configured to collect event data associated with an event wherein the event data associated with the event includes a listing of potential attendees and historical wireless communication network usage of the potential attendees;
a predictive management system in communication with the data collection system, the predictive management system configured to receive the event data from the data collection system and to predict attendance at the event and wireless communication network usage during the event, wherein the predicted attendance at the event is based on the listing of potential attendees, and the predicted wireless communication network usage is based on the predicted attendance and the historical wireless communication network usage of the potential attendees;
a master service orchestrator in communication with the predictive management systems, the master service orchestrator configured to receive the predicted wireless communication network usage from the predictive management system and to instantiate virtual network resources based on the predicted wireless communication network usage;
an event ending system in communication with the predictive management system and the master service orchestrator wherein the event ending system is configured to collect wireless communication network performance metrics during the event and actual attendance at the event and send the network performance metrics and the actual attendance to the predictive management system, wherein the actual attendance at the event is observed by analysis of the wireless communication network metrics; and
wherein the predictive management system is further configured to receive the wireless communication network performance metrics and the actual attendance and wherein the predictive management system is adjusted based on the wireless communication network performance metrics and the actual attendance.

* * * * *